United States Patent
Hayakawa

(10) Patent No.: US 8,694,628 B2
(45) Date of Patent: Apr. 8, 2014

(54) WIRELESS COMMUNICATION SYSTEM

(75) Inventor: Yoshiaki Hayakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 13/143,401

(22) PCT Filed: Nov. 13, 2009

(86) PCT No.: PCT/JP2009/069349
§ 371 (c)(1), (2), (4) Date: Jul. 6, 2011

(87) PCT Pub. No.: WO2010/087065
PCT Pub. Date: Aug. 5, 2010

(65) Prior Publication Data
US 2011/0270980 A1    Nov. 3, 2011

(30) Foreign Application Priority Data

Jan. 30, 2009  (JP) ................. 2009-019656

(51) Int. Cl.
*G06F 15/173*   (2006.01)

(52) U.S. Cl.
USPC ............... 709/224; 455/432.1; 455/435.1

(58) Field of Classification Search
USPC ............... 709/224, 230; 455/432.1, 435.1
See application file for complete search history.

(56) References Cited

U.S. PATENT DOCUMENTS

| | | | |
|---|---|---|---|
| 5,873,031 A * | 2/1999 | Griffith et al. | 455/432.1 |
| 7,191,244 B2 * | 3/2007 | Jennings et al. | 709/231 |
| 7,305,429 B2 * | 12/2007 | Borella | 709/203 |
| 7,536,467 B2 * | 5/2009 | Guo et al. | 709/230 |
| 7,549,173 B2 * | 6/2009 | Brownell et al. | 726/27 |
| 7,802,092 B1 * | 9/2010 | Kelly et al. | 713/156 |
| 7,865,772 B2 * | 1/2011 | Mogi et al. | 714/20 |
| 8,291,489 B2 * | 10/2012 | Droms et al. | 726/15 |
| 2003/0181209 A1 * | 9/2003 | Forte | 455/445 |
| 2004/0157590 A1 * | 8/2004 | Lazaridis et al. | 455/415 |

(Continued)

FOREIGN PATENT DOCUMENTS

| CN | 1973513 A | 5/2007 |
|---|---|---|
| JP | 2002101442 A | 4/2002 |

(Continued)

OTHER PUBLICATIONS

International Search Report for PCT/JP2009/069349 mailed Feb. 2, 2010.

(Continued)

*Primary Examiner* — Dustin Nguyen
(74) *Attorney, Agent, or Firm* — Sughrue Mion, PLLC

(57) ABSTRACT

Apparatus identification information about wireless access apparatuses judged to be able to communicate with a monitoring apparatus, among multiple wireless access apparatuses, is stored in a neighborhood database. If there is apparatus identification information that is not stored in the neighborhood database, among apparatus identification information stored in a registration database in which apparatus identification information about wireless access apparatuses registered as monitoring targets of the monitoring apparatus is stored, it is judged again for a wireless access apparatus to which the apparatus identification information is given whether communication is possible, after a predetermined time elapses. On the other hand, if there is no such apparatus information, or if the judgment is performed again for a predetermined number of times, the apparatus identification information stored in the neighborhood database is copied to the registration database.

15 Claims, 9 Drawing Sheets

(56) References Cited

U.S. PATENT DOCUMENTS

| | | |
|---|---|---|
| 2005/0158846 A1* | 7/2005 | Hibino et al. .............. 435/287.1 |
| 2009/0047950 A1* | 2/2009 | Doppler et al. ............ 455/435.1 |
| 2009/0132705 A1* | 5/2009 | Matsuzaki et al. ............ 709/225 |

FOREIGN PATENT DOCUMENTS

| | | |
|---|---|---|
| JP | 2004088592 A | 3/2004 |
| JP | 2005236699 A | 9/2005 |
| JP | 2006157309 A | 6/2006 |
| JP | 2006253849 A | 9/2006 |
| JP | 2007208703 A | 8/2007 |

OTHER PUBLICATIONS

Chinese Office Action for CN Application No. 200980155199.2 issued on Jul. 23, 2013 with English Translation.

* cited by examiner

Fig. 3

| apparatus number | IP address |
|---|---|
| terminal 210 | A |
| terminal 220 | B |
| terminal 230 | C |
| terminal 240 | D |
| terminal 250 | E |
| terminal 260 | F |

Fig. 5

| management ID | IP address | neighborhood IP address |
|---|---|---|
| 1 | A | B |
| 2 | B | A<br>C |
| 3 | C | B<br>D<br>E |
| 4 | D | C |
| 5 | E | C |
| 6 | F | E |

Fig. 6

| management ID | IP address | neighborhood IP address |
|---|---|---|
| 1 | A | B |
| 2 | B | A C |
| 3 | C | B |
| 4 | D | C |

Fig. 9

| management ID | IP address | neighborhood IP address |
|---|---|---|
| 1 | A | B |
| 2 | B | A C |
| 3 | C | B E |
| 4 | E | C |
| 5 | F | E |

US 8,694,628 B2

WIRELESS COMMUNICATION SYSTEM

This application is the National Phase of PCT/JP2009/069349, filed Nov. 13, 2009, which claims priority based on JP2009-19656A filed on Jan. 30, 2009, the disclosure of which is hereby incorporated by reference thereto in its entirety.

TECHNICAL FIELD

The present invention relates to a wireless communication system that monitors wireless access apparatuses, a monitoring apparatus, a monitoring method and a program.

BACKGROUND ART

Recently, communication using a wireless technique has been frequently used.

FIG. 1 shows an example of a wireless communication system using a wireless technique.

The wireless communication system shown in FIG. 1 includes a monitoring apparatus 1000 and wireless access apparatuses 2001 to 2004.

The monitoring apparatus 1000 monitors the wireless access apparatuses 2001 to 2004.

Wireless access apparatuses 2001 to 2004 are apparatuses equipped with a wireless communication function. Wireless access apparatus 2001 performs wired communication with monitoring apparatus 1000. Wireless access apparatus 2001 performs wireless communication with wireless access apparatus 2002. Wireless access apparatus 2002 performs wired communication with wireless access apparatus 2003. Wireless access apparatus 2003 performs wireless communication with wireless access apparatus 2004.

Monitoring apparatus 1000 registers apparatus identification information (for example an IP (Internet Protocol) address) given to each of wireless access apparatuses 2001 to 2004 so as to identify each of wireless access apparatuses 2001 to 2004 inside thereof in advance, and monitors the states of wireless access apparatuses 2001 to 2004 by periodically polling wireless access apparatuses 2001 to 2004.

As for a method for registering the IP addresses of the wireless access apparatuses 2001 to 2004 with monitoring apparatus 1000, a technique has been considered in which a monitored target is registered with a monitoring apparatus by using a method of "providing a wireless access apparatus with a mechanism for detecting the IP address of an adjacent wireless access apparatus" and a method of "a monitoring apparatus reading a neighborhood IP address of the wireless access apparatus and further acquiring a neighborhood IP address from a wireless access apparatus on the basis of the neighborhood IP address" (for example, see Patent Literature 1).

CITATION LIST

Patent Literature
Patent Literature 1: JP2006-253849A

SUMMARY OF INVENTION

Technical Problem

In the technique described above, however, if a partial wireless section is temporally interrupted due to phasing when an attempt is made to add a wireless access apparatus to a wireless network which is a target of monitoring by a monitoring apparatus, there is a possibility that a wireless access apparatus which is not registered with the monitoring apparatus as a monitoring target may be present.

The object of the present invention is to provide a wireless communication system which solves the above problem, a monitoring apparatus, a monitoring method and a program.

Solution to Problem

The wireless communication system of the present invention is:

a wireless communication system comprising multiple wireless access apparatuses equipped with a wireless communication function and a monitoring apparatus monitoring the wireless access apparatuses, wherein the monitoring apparatus judges whether communication with the multiple wireless access apparatuses is possible, stores apparatus identification information, that has been given to the wireless access apparatuses, so that wireless access apparatuses with which communication is judged to be possible can be identified, into a neighborhood database, if there is apparatus identification information that is not stored in the neighborhood database among apparatus identification information stored in a registration database in which apparatus identification information has been given to wireless access apparatuses so that wireless access apparatuses registered as monitoring targets of the monitoring apparatus can be identified, performs judgment again for a wireless access apparatus to which the identification information is given, after a predetermined time elapses, and, if there is no apparatus identification information that is not stored in the neighborhood database among apparatus identification information stored in the registration database or if the judgment is performed again for a predetermined number of times, copies the apparatus identification information stored in the neighborhood database to the registration database and stores the apparatus identification information in the registration database.

The monitoring apparatus of the present invention is:

a monitoring apparatus monitoring multiple wireless access apparatuses, the monitoring apparatus comprising:

a registration database storing apparatus identification information, that has been given to the wireless access apparatuses, so that wireless access apparatuses registered as monitoring targets of the monitoring apparatus can be identified;

a judgment section judging whether communication with the multiple wireless access apparatuses is possible;

a neighborhood database storing apparatus identification information, that has been given to the wireless access apparatuses, so that the wireless access apparatuses with which the judgment section has judged that communication is possible can be identified; and a comparison section judging whether there is apparatus identification information that is not stored in the neighborhood database among the apparatus identification information stored in the registration database, wherein if the comparison section judges that there is apparatus identification information that is not stored in the neighborhood database, among the apparatus identification information stored in the registration database, the judgment section performs judgment again for a wireless access apparatus to which the apparatus identification information is given, after a predetermined time elapses; and the monitoring apparatus further comprises a duplication section copying and storing the apparatus identification information stored in the neighborhood database into the registration database if the comparison section judges that there is no apparatus identification information that is not stored in the neighborhood database, among the apparatus identification information stored in the registration database, or if the judgment section has performed judgment again for a predetermined number of times.

The monitoring method of the present invention is:

a monitoring method in a monitoring apparatus monitoring multiple wireless access apparatuses, the method comprising the steps of:

storing apparatus identification information, that has been given to the wireless access apparatuses, so that wireless access apparatuses registered as monitoring targets of the monitoring apparatus can be identified, into a registration database;

judging whether communication between the monitoring apparatus and the multiple wireless access apparatuses is possible;

storing apparatus identification information, that has been given to the wireless access apparatuses, so that the wireless access apparatuses with which communication is judged to be possible can be identified, into a neighborhood database;

judging whether there is apparatus identification information that is not stored in the neighborhood database among the apparatus identification information stored in the registration database;

in the case of having judged that there is apparatus identification information that is not stored in the neighborhood database among the apparatus identification information stored in the registration database, performing judgment again for a wireless access apparatus to which the apparatus identification information is given, after a predetermined time elapses; and in the case of having judged that there is no apparatus identification information that is not stored in the neighborhood database among the apparatus identification information stored in the registration database, or in the case of having performed the judgment again for a predetermined number of times, copying and storing the apparatus identification information stored in the neighborhood database into the registration database.

The program of the present invention is:

a program for causing a monitoring apparatus which monitors multiple wireless access apparatuses to execute the procedures of:

storing apparatus identification information, that has been given to the wireless access apparatuses, so that wireless access apparatuses registered as monitoring targets of the monitoring apparatus can be identified, into a registration database;

judging whether communication between the monitoring apparatus and the multiple wireless access apparatuses is possible;

storing apparatus identification information, that has been given to the wireless access apparatuses, so that the wireless access apparatuses with which communication is judged to be possible can be identified, into a neighborhood database;

judging whether there is apparatus identification information that is not stored in the neighborhood database, among the apparatus identification information stored in the registration database;

in the case of having judged that there is apparatus identification information that is not stored in the neighborhood database among the apparatus identification information stored in the registration database, performing judgment again for a wireless access apparatus to which the apparatus identification information is given, after a predetermined time elapses; and in the case of having judged that there is no apparatus identification information that is not stored in the neighborhood database among the apparatus identification information stored in the registration database, or in the case of having performed judgment again for a predetermined number of times, copying and storing the apparatus identification information stored in the neighborhood database into the registration database.

Advantageous Effects of Invention

As described above, in the present invention, it is judged whether communication is possible between a monitoring apparatus which monitors wireless access apparatuses and the wireless access apparatuses; apparatus identification information, that has been given to the wireless access apparatuses, so that wireless access apparatuses with which communication is judged to be possible can be identified, is registered into a neighborhood database; if there is apparatus identification information that is not stored in the neighborhood database among apparatus identification information stored in a registration database in which apparatus identification information has been given to wireless access apparatuses so that wireless access apparatuses registered as monitoring targets of the monitoring apparatus can be identified, the judgment is performed again for a wireless access apparatus to which the apparatus identification information is given, after a predetermined time elapses; and, if there is no such apparatus identification information that is not stored in the neighborhood database among the apparatus identification information stored in the registration database, or if the judgment is performed again for a predetermined number of times, the apparatus identification information stored in the neighborhood database is copied and stored into the registration database. Therefore, even if a partial wireless section is temporally interrupted due to phasing, it is possible to prevent a wireless access apparatus which is not registered with the monitoring apparatus as a monitoring target from being present.

BRIEF DESCRIPTION OF DRAWINGS

FIG. 3 is a diagram showing IP addresses given to wireless access apparatuses shown in FIG. 2 as apparatus identification information so as to identify the wireless access apparatuses.

FIG. 5 is a diagram showing an example of information stored in a neighborhood DB shown in FIG. 4.

FIG. 6 is a diagram showing an example of information stored in a previous neighborhood DB shown in FIG. 4.

FIG. 9 is a diagram showing an example of information about association between IP addresses and neighborhood IP addresses stored in the neighborhood DB in the case where there is a wireless access apparatus in which communication has been interrupted, in the exemplary embodiment shown in FIG. 2.

DESCRIPTION OF EMBODIMENT

An exemplary embodiment will be described below with reference to drawings.

Figure 1:
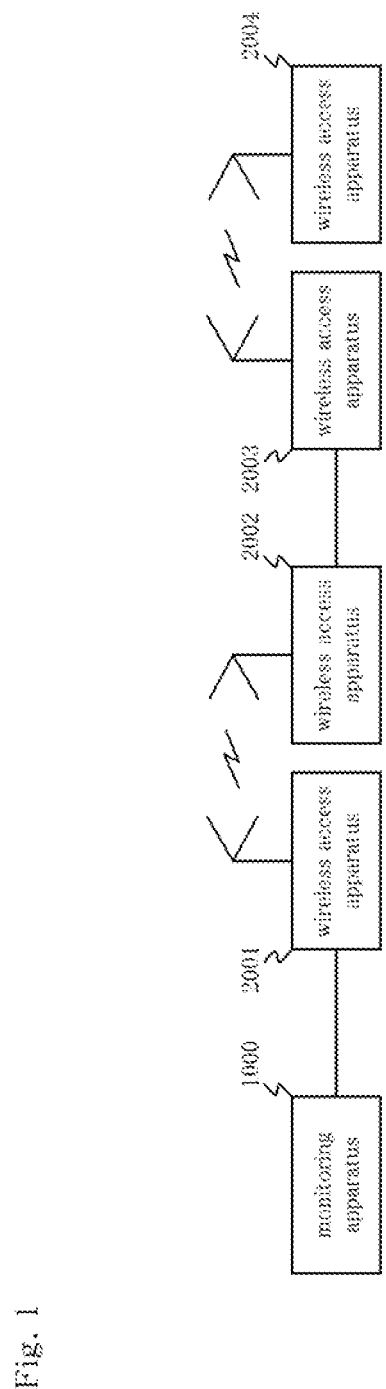
FIG. 1 is a diagram showing an example of a wireless communication system using a wireless technique.
Figure 2:
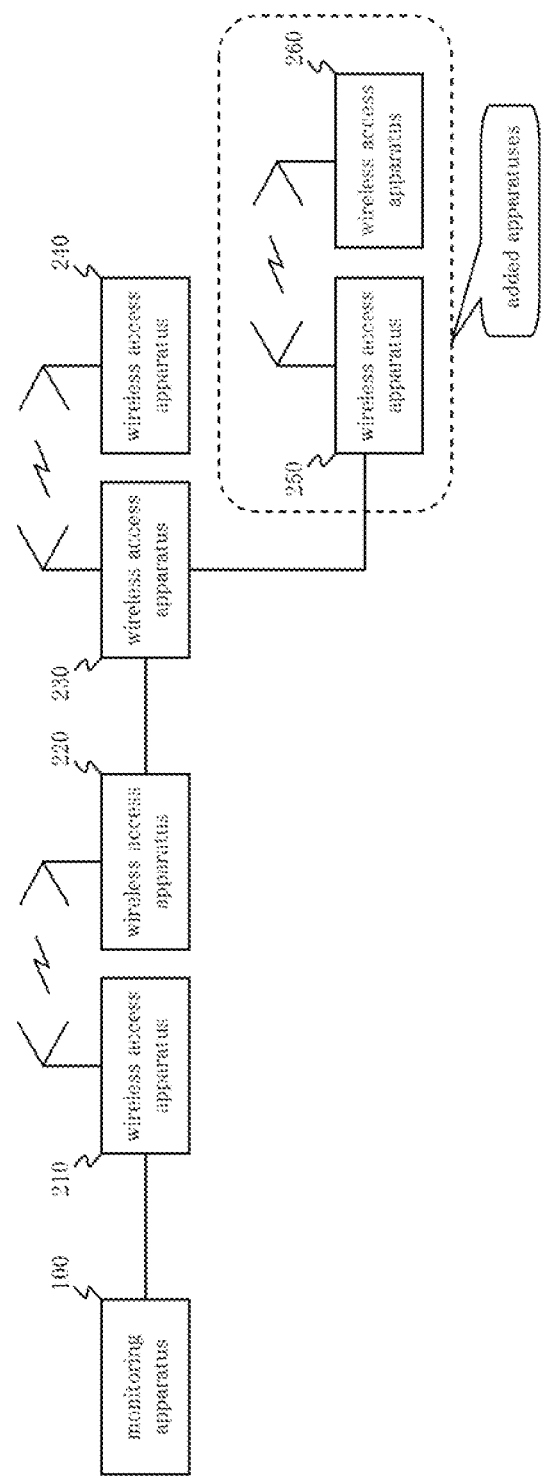
FIG. 2 is a diagram showing an exemplary embodiment of the wireless communication system of the present invention.

FIG. 2 is a diagram showing an exemplary embodiment of a wireless communication system of the present invention.

This exemplary embodiment comprises monitoring apparatus 100 and wireless access apparatuses 210, 220, 230, 240, 250 and 260 as shown in FIG. 2.

Monitoring apparatus 100 monitors wireless access apparatuses 210, 220, 230, 240, 250 and 260.

Wireless access apparatuses 210, 220, 230, 240, 250 and 260 are apparatuses equipped with a wireless communication function. Wireless access apparatus 210 performs wired communication with monitoring apparatus 100. Wireless access apparatus 210 performs wireless communication with wireless access apparatus 220. Wireless access apparatus 220 performs wired communication with wireless access apparatus 230. Wireless access apparatus 230 performs wireless communication with wireless access apparatus 240. Wireless access apparatuses 250 and 260 are apparatuses added as targets monitored by monitoring apparatus 100 by additional installation or the like. Wireless access apparatus 250 performs wired communication with wireless access apparatus 230. Wireless access apparatus 250 performs wireless communication with wireless access apparatus 260.

FIG. 3 is a diagram showing IP addresses given to each of wireless access apparatuses 210, 220, 230, 240, 250 and 260 shown in FIG. 2 as apparatus identification information so as to identify wireless access apparatuses 210, 220, 230, 240, 250 and 260.

As shown in FIG. 3, an IP address is given to each of wireless access apparatuses 210, 220, 230, 240, 250 and 260.

For example, an IP address "A" is given to wireless access apparatus 210. An IP address "B" is given to wireless access apparatus 220. An IP address "C" is given to wireless access apparatus 230. An IP address "D" is given to wireless access apparatus 240. An IP address "E" is given to wireless access apparatus 250. An IP address "F" is given to wireless access apparatus 260.

Figure 4:
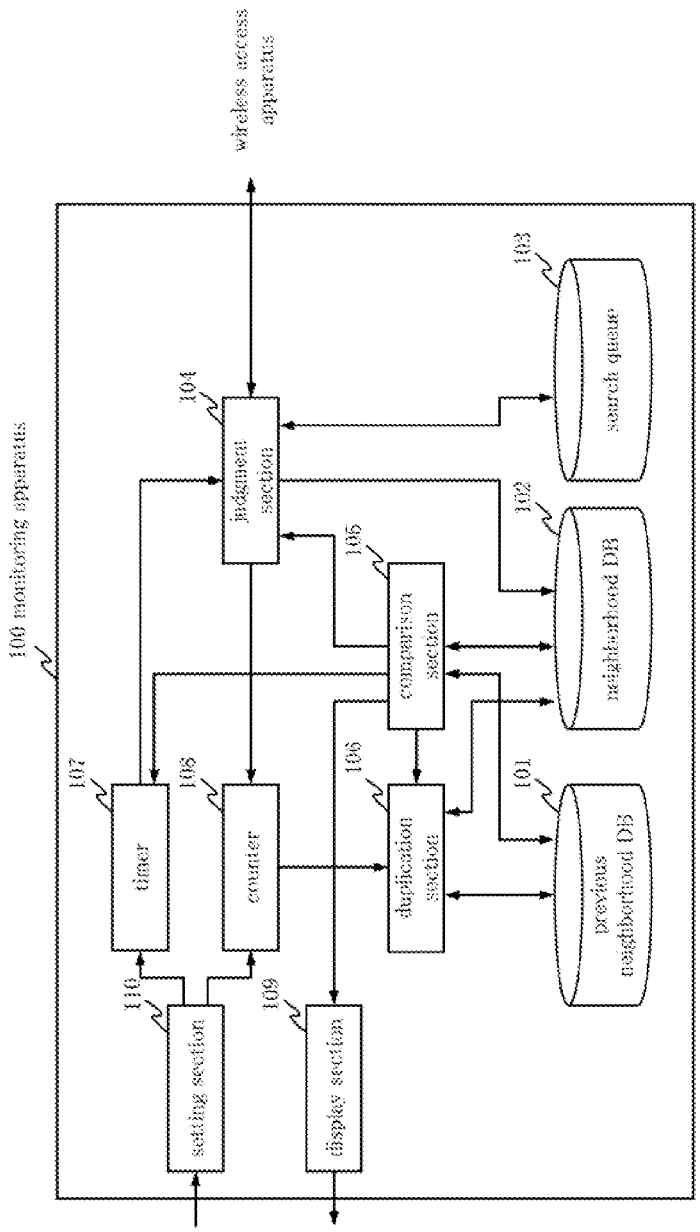
FIG. 4 is a diagram showing an example of the internal configuration of a monitoring apparatus shown in FIG. 2.

FIG. 4 is a diagram showing an example of the internal configuration of monitoring apparatus 100 shown in FIG. 2.

The monitoring apparatus 100 shown in FIG. 2 is provided with previous neighborhood DB 101, neighborhood DB 102, search queue 103, judgment section 104, comparison section 105, duplication section 106, timer 107, counter 108, display section 109 and setting section 110, as shown in FIG. 3. FIG. 3 shows only such components that are related to the present invention among components provided for the monitoring apparatus 100.

Neighborhood DB 102 is a neighborhood database which stores apparatus identification information that has been given to a wireless access apparatus so that a wireless access apparatus judged to be able to communicate with the monitoring apparatus 100 can be identified. A method for the judgment and a method for the storage will be described later.

FIG. 5 is a diagram showing an example of information stored in the neighborhood DB 102 shown in FIG. 4.

In the neighborhood DB 102 shown in FIG. 4, a management ID, an IP address and a neighborhood IP address are stored in association with one another as shown in FIG. 5.

The management ID (Identification) is a number for managing association between the IP address and the neighborhood IP address. A method for giving the management ID is not especially specified.

The IP address is an IP address (apparatus identification information) given to a wireless access apparatus from which monitoring apparatus 100 requests neighborhood information. Here, the neighborhood information is an IP address (apparatus identification information) given to a wireless access apparatus which is adjacently connected to the wireless access apparatus to which the IP address is given.

The neighborhood IP address is the neighborhood information described above.

For example, management ID "1", IP address "A" and neighborhood IP address "B" are stored in association with one another. This indicates: it is stored under the management ID "1" in which wireless access apparatus 210 whose IP address is "A" is judged to be able to communicate with monitoring apparatus 100, and that a wireless access apparatus which is adjacently connected to wireless access apparatus 210 whose IP address is "A" is wireless access apparatus 220 whose IP address is "B". Furthermore, management ID "2", IP address "B" and neighborhood IP addresses "A" and "C" are stored in association with one another. This indicates: it is stored under the management ID "2" in which wireless access apparatus 220 whose IP address is "B" is judged to be able to communicate with monitoring apparatus 100, and that wireless access apparatuses which are adjacently connected to wireless access apparatus 220 whose IP address is "B" are wireless access apparatus 210 whose IP address is "A" and wireless access apparatus 230 whose IP address is "C". Furthermore, management ID "3", IP address "C" and neighborhood IP addresses "B", "D" and "E" are stored in association with one another. This indicates: it is stored under management ID "3" in which wireless access apparatus 230 whose IP address is "C" is judged to be able to communicate with monitoring apparatus 100, and that wireless access apparatuses which are adjacently connected to wireless access apparatus 230 whose IP address is "C" are wireless access apparatus 220 whose IP address is "B", wireless access apparatus 240 whose IP address is "D" and wireless access apparatus 250 whose IP address is "E". Furthermore, management ID "4", IP address "D" and neighborhood IP address "C" are stored in association with one another. This indicates: it is stored under management ID "4" in which wireless access apparatus 240 whose IP address is "D" is judged to be able to communicate with monitoring apparatus 100, and that a wireless access apparatus which is adjacently connected to wireless access apparatus 240 whose IP address is "D" is wireless access apparatus 230 whose IP address is "C". Furthermore, management ID "5", IP address "E" and neighborhood IP address "C" are stored in association with one another. This indicates: it is stored under management ID "5" in which wireless access apparatus 250 whose IP address is "E" is judged to be able to communicate with monitoring apparatus 100, and that a wireless access apparatus which is adjacently connected to wireless access apparatus 250 whose IP address is "E" is wireless access apparatus 230 whose IP address is "C". Furthermore, management ID "6", IP address "F" and neighborhood IP address "E" are stored in association with one another. This indicates: it is stored under management ID "6" in which wireless access apparatus 260 whose IP address is "F" is judged to be able to communicate with monitoring apparatus 100, and that a wireless access apparatus which is adjacently connected to wireless access apparatus 260 whose IP address is "F" is wireless access apparatus 250 whose IP address is "E".

The previous neighborhood DB 101 is a registration database which stores apparatus identification information given so that a wireless access apparatus registered as a monitoring target of the monitoring apparatus 100 can be identified. A method for the storage will be described later.

FIG. 6 is a diagram showing an example of information stored in previous neighborhood DB 101 shown in FIG. 4.

In previous neighborhood DB 101 shown in FIG. 4, a management ID, an IP address and a neighborhood IP address are stored in association with one another as shown in FIG. 6.

The management ID (Identification) is a number for managing association between the IP address and the neighborhood IP address. A method for giving the management ID is not especially specified.

The IP address is an IP address (apparatus identification information) given to a wireless access apparatus registered as a target monitored by the monitoring apparatus 100.

The neighborhood IP address is an IP address (apparatus identification information) given to a wireless access apparatus which is adjacently connected to a wireless access apparatus to which an IP address is given.

For example, management ID "1", IP address "A" and neighborhood IP address "B" are stored in association with one another. This indicates: it is stored under management ID "1" in which wireless access apparatus 210 whose IP address is "A" is a target to be monitored by monitoring apparatus 100, and that a wireless access apparatus which is adjacently connected to wireless access apparatus 210 whose IP address is "A" is wireless access apparatus 220 whose IP address is "B". Furthermore, management ID "2", IP address "B" and neighborhood IP addresses "A" and "C" are stored in association with one another. This indicates: it is stored under management ID "2" in which wireless access apparatus 220 whose IP address is "B" is a target to be monitored by monitoring apparatus 100, and that wireless access apparatuses which are adjacently connected to wireless access apparatus 220 whose IP address is "B" are wireless access apparatus 210 whose IP address is "A" and wireless access apparatus 230 whose IP address is "C". Furthermore, management ID "3", IP address "C" and neighborhood IP addresses "B" are stored in association with one another. This indicates: it is stored under management ID "3" in which wireless access apparatus 230 whose IP address is "C" is a target to be monitored by monitoring apparatus 100, and that a wireless access apparatus which is adjacently connected to wireless access apparatus 230 whose IP address is "C" is wireless access apparatus 220 whose IP address is "B". Furthermore, management ID "4", IP address "D" and neighborhood IP addresses "C" are stored in association with one another. This indicates: it is stored under management ID "4" in which wireless access apparatus 240 whose IP address is "D" is a target to be monitored by monitoring apparatus 100, and that a wireless access apparatus which is adjacently connected to wireless access apparatus 240 whose IP address is "D" is wireless access apparatus 230 whose IP address is "C".

Search queue 103 temporarily stores an IP address (apparatus identification information) given to a wireless access apparatus to be a target from which neighborhood information is requested.

Judgment section 104 judges a wireless access apparatus able to communicate with monitoring apparatus 100. According to a method for making this judgment, if neighborhood information requested by the judgment section 104 is received, it is judged that a wireless access apparatus to which this neighborhood information is given is able to communicate with the monitoring apparatus 100. A concrete method will be described later.

Comparison section 105 compares information stored in previous neighborhood DB 101 with information stored in neighborhood DB 102 and outputs a result of the comparison to judgment section 104, duplication section 106 and display section 109.

Duplication section 106 copies the contents stored in neighborhood DB 102 to previous neighborhood DB 101 on the basis of a result of comparison by comparison section 105 or on the basis of whether or not the value indicated by counter 108 has exceeded a preset threshold.

Timer 107 is a clock for measuring time. Timer 107 starts measurement of time on the basis of a result of comparison by comparison section 105 and, when a predetermined time has elapsed, notifies judgment section 104 of it.

Counter 108 performs addition processing (counting) of the number of times on the basis of a judgment result from judgment section 104. Counter 108 notifies duplication section 106 of a value indicated by counter 108.

Display section 109 displays information on the basis of a result of comparison by comparison section 105.

Setting section 110 sets the values of timer 107 and counter 108 in response to an input from the outside.

Figure 7:
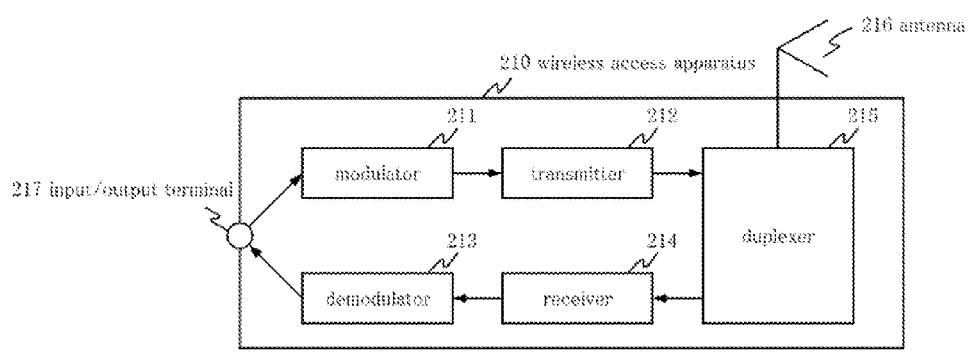
FIG. 7 is a diagram showing an example of the internal configuration of the wireless access apparatuses shown in FIG. 2.

FIG. 7 is a diagram showing an example of the internal configuration of wireless access apparatus 210 shown in FIG. 2.

Wireless access apparatus 210 shown in FIG. 2 is provided with modulator 211, transmitter 212, demodulator 213, receiver 214, duplexer 215, antenna 216 and input/output terminal 217 as shown in FIG. 7. FIG. 7 shows only such components that are related to the present invention among components provided for wireless access apparatus 210. Wireless access apparatuses 220, 230, 240, 250 and 260 are also provided with the components provided for wireless access apparatus 210 shown in FIG. 7.

Modulator 211 modulates a signal inputted at input/output terminal 217 and outputs it to transmitter 212.

Transmitter 212 amplifies the signal outputted from modulator 211 and outputs it to duplexer 215.

Duplexer 215 separates radio waves for a signal outputted from transmitter 212 and a signal outputted from antenna 216.

Antenna 216 transmits a signal to be transmitted to a wireless section separated by duplexer 215. Antenna 216 also receives a signal transmitted from the wireless section and outputs it to duplexer 215.

Receiver 214 receives a signal outputted from duplexer 215 and outputs it to demodulator 213.

Demodulator 213 demodulates the signal outputted from receiver 214 and outputs it to input/output terminal 217.

Input/output terminal 217 is a terminal that will function as an interface between the wireless access apparatus 210 and external equipment.

A method for monitoring wireless access apparatuses 210, 220, 230, 240, 250 and 260 in monitoring apparatus 100 will be described below.

Figure 8:
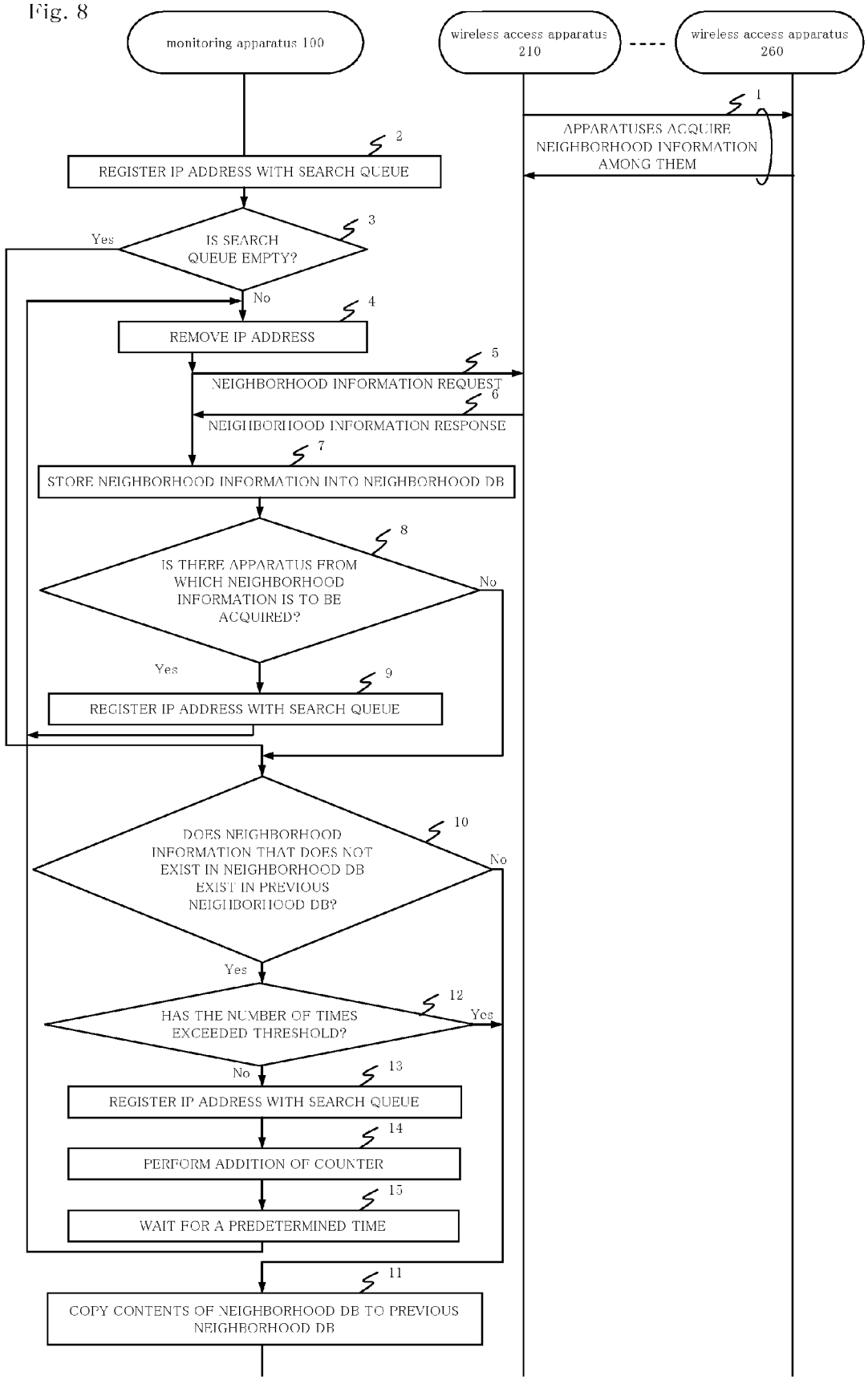
FIG. 8 is a sequence diagram for illustrating a method for monitoring the wireless access apparatuses in the monitoring apparatus shown in FIG. 2.

FIG. 8 is a sequence diagram for illustrating the method for monitoring wireless access apparatuses 210, 220, 230, 240, 250 and 260 in monitoring apparatus 100 shown in FIG. 2.

First, at step 1, mutual neighborhood information (apparatus identification information) is acquired among wireless access apparatuses 210, 220, 230, 240, 250 and 260. Any method is possible as the method for this acquisition if apparatus identification information about an adjacent wireless access apparatus can be acquired, and a concrete method is not specified. The case where the apparatus identification is an IP address will be described below as an example.

When IP address A of wireless access apparatus 210 is inputted by an operator at monitoring apparatus 100 in this state, inputted IP address A of wireless access apparatus 210 is registered with search queue 103 at step 2.

Next, at step 3, it is judged by judgment section 104 whether search queue 103 is empty. Here, since the IP address A is registered with search queue 103, it is judged that search queue 103 is not empty.

When it is judged that search queue 103 is not empty, the IP address registered with search queue 103 (the IP address A in this case) is removed out by judgment section 104 at step 4.

Then, with the use of IP address A removed from search queue 103 by judgment section 104, neighborhood information is requested from wireless access apparatus 210 at step 5.

Wireless access apparatus 210 from which the neighborhood information is requested by monitoring apparatus 100 transmits the neighborhood information acquired at step 1 to monitoring apparatus 100 as a neighborhood information response at step 6. In the exemplary embodiment shown in FIG. 2, since the wireless access apparatus which is adjacently connected to wireless access apparatus 210 is wireless access apparatus 220, IP address B of wireless access apparatus 220 is transmitted.

The neighborhood information (IP address B) transmitted from wireless access apparatus 210 is stored in neighborhood DB 102 by judgment section 104 as shown in FIG. 5 at step 7. The wireless access apparatus to which this neighborhood information stored in neighborhood DB 102 is given is judged to be able to communicate with monitoring apparatus 100.

Next, at step 8, it is judged by judgment section 104 whether there is any other wireless access apparatus from which neighborhood information is to be acquired. This judgment is performed as described below.

Among information stored in neighborhood DB 102, the IP address column and neighborhood IP address column shown in FIG. 5 are compared by judgment section 104. Then, if there is such an IP address that exists in the neighborhood IP address column but does not exist in the IP address column as a result of the comparison, it is judged that there is another wireless access apparatus from which neighborhood information is to be acquired. Here, it is judged that wireless access apparatus 220 to which the IP address B is given is the wireless access apparatus from which neighborhood information is to be acquired. Then, the IP address B is registered with search queue 103 by judgment section 104 at step 9, and the processing of step 4 is performed for IP address B. In the exemplary embodiment shown in FIG. 2, the processings of steps 4 to 8 are performed for IP addresses B, C, D, E and F.

On the other hand, if it is judged by judgment section 104 at step 8 that there is no other wireless access apparatus from which neighborhood information is to be acquired, that is, if neighborhood information is stored in neighborhood DB 102 for the IP addresses A, B, C, D, E and F, then information stored in neighborhood DB 102 and information stored in previous neighborhood DB 101 are compared by comparison section 105 at step 10. Specifically, this comparison is performed by judging whether there is any IP address that is not stored in neighborhood DB 102 among IP addresses stored in previous neighborhood DB 101.

If it is judged at step 10 that there is no IP address that is not stored in neighborhood DB 102 among the IP addresses stored in previous neighborhood DB 101, then the information (IP addresses) stored in neighborhood DB 102 is copied and stored in previous neighborhood DB 101 by duplication section 106 at step 11.

On the other hand, if it is judged at step 10 that there is an IP address that is not stored in neighborhood DB 102 among the IP addresses stored in previous neighborhood DB 101, then it is judged by judgment section 104 at step 12 whether the number of times indicated by counter 108 has exceeded the number of times set in advance (threshold).

FIG. 9 is a diagram showing an example of the information about association between IP addresses and neighborhood IP addresses stored in neighborhood DB 102 in the case where communication between wireless access apparatus 230 and wireless access apparatus 240 is interrupted, in the exemplary embodiment shown in FIG. 2.

As shown in FIG. 9, in the case where communication between wireless access apparatus 230 and wireless access apparatus 240 is interrupted in the exemplary embodiment shown in FIG. 2, the IP addresses related to IP address D do not exist among the IP addresses stored in previous neighborhood DB 101 shown in FIG. 6. In such a case, the processing of step 12 is performed.

If it is judged at step 12 that the number of times indicated by counter 108 has exceeded the number of times set in advance, the processing of step 11 is performed. Display to that effect is indicated on display section 109 then. The contents of the display may be information indicating that neighborhood information cannot be acquired (communication is not possible) although acquisition of the neighborhood information has been attempted for a predetermined number of times.

On the other hand, if it is judged at step 12 that the number of times indicated by counter 108 has not exceeded the number of times set in advance, then the IP address which is not stored in neighborhood DB 102, among the IP addresses stored in previous neighborhood DB 101, is registered with search queue 103 at step 13.

Furthermore, one is added to the number of times indicated by counter 108 by judgment section 104 at step 14.

After that, measurement of time is started by timer 107, and processing of step 4 is performed for the IP address registered with search queue 103 at step 13 after a preset time elapses at step 15. That is, for the IP address which is not stored in neighborhood DB 102, among IP addresses stored in previous neighborhood DB 101, neighborhood information is acquired again after a predetermined time elapses.

The processing is repeated if the number of times indicated by counter 108 has not exceeded the predetermined number of times at step 12. Thus, it is possible to avoid registration of a wireless access apparatus whose communication is temporarily interrupted by using the number of protection steps.

The process performed by the monitoring apparatus 100 described above may be performed by a logic circuit manufactured according for that the purpose. It is also possible to record a program in which the contents of the process are described as a procedure on a recording medium which can be read by monitoring apparatus 100, cause monitoring apparatus 100 to read and execute the program recorded on the recording medium. The recording medium which can be read by monitoring apparatus 100 refers to a memory included in monitoring apparatus 100, such as a ROM and a RAM, an HDD or the like, in addition to a movable recording medium such as a Floppy Disk®, a magneto-optical disk, a DVD and a CD. The program recorded on the recording medium is read by a CPU (not shown) in monitoring apparatus 100, and a process similar to that described above is performed under the control of the CPU. Here, the CPU operates as a computer which executes the program read from the recording medium on which the program is recorded.

As described above, advantages as described below can be obtained in the present invention.

A first advantage is that registration omission can be prevented by a monitoring system that detects an apparatus which has failed in neighborhood search and registration with the automatic registration monitoring system of a monitoring apparatus because of interruption of a wireless section due to phasing and automatically executing automatic neighborhood registration again after some time elapse.

A second advantage is that an operator can recognize an apparatus which has failed in neighborhood search and automatic registration with the monitoring apparatus because of interruption of a wireless section due to phasing.

The present invention has been described with reference to an exemplary embodiment. However, the present invention is not limited to the above exemplary embodiment. Various changes understandable by one skilled in the art can be made in the constitution or the details of the present invention within the scope of the present invention.

The invention claimed is:

1. A wireless communication system comprising multiple wireless access apparatuses equipped with a wireless communication function and a monitoring apparatus monitoring the wireless access apparatuses, wherein
the monitoring apparatus judges whether communication with the multiple wireless access apparatuses is possible, stores apparatus identification information, that has been given to the wireless access apparatuses, so that wireless access apparatuses with which communication is judged to be possible can be identified, into a neighborhood database, if there is apparatus identification information that is not stored in the neighborhood database, among apparatus identification information stored in a registration database in which apparatus identification information has been given to wireless access apparatuses so that wireless access apparatuses registered as monitoring targets of the monitoring apparatus can be identified, performs the judgment again for a wireless access apparatus to which the identification information is given, after a predetermined time elapses, and, if there is no apparatus identification information that is not stored in the neighborhood database among apparatus identification information stored in the registration database or if the judgment is performed again for a predetermined number of times, copies the apparatus identification information stored in the neighborhood database to the registration database and stores the apparatus identification information in the registration database, and
the monitoring apparatus requests that the apparatus identification information be given wireless access apparatuses which are adjacently connected to the multiple wireless access apparatuses, from the multiple wireless access apparatuses and, when the apparatus identification information is transmitted from the wireless access apparatuses in response to the request, judges that communication with the wireless access apparatuses to which the apparatus identification information is given is possible, and
when the request is issued, the wireless access apparatuses transmit the apparatus identification information that has been given to the wireless access apparatuses which are adjacently connected to the wireless access apparatuses, to the monitoring apparatus.

2. The wireless communication system according to claim 1, wherein
if the judgment is performed again for a predetermined number of times, the monitoring apparatus presents a display to that effect.

3. The wireless communication system according to claim 1, wherein
the monitoring apparatus stores IP addresses into the neighborhood database as the apparatus identification information.

4. The wireless communication system according to claim 1, wherein
the monitoring apparatus requests an IP address as the apparatus identification information; and
the wireless access apparatuses transmit an IP address as the apparatus identification information.

5. The wireless communication system according to claim 1, wherein
the monitoring apparatus sets the predetermined time in response to an input from outside.

6. The wireless communication system according to claim 1, wherein
the monitoring apparatus sets the predetermined number of times in response to an input from outside.

7. A monitoring apparatus monitoring multiple wireless access apparatuses, the monitoring apparatus comprising:
a registration database that stores apparatus identification information, that has been given to the wireless access apparatuses, so that wireless access apparatuses registered as monitoring targets of the monitoring apparatus can be identified;
a judgment section that judges whether communication with the multiple wireless access apparatuses is possible;
a neighborhood database that stores apparatus identification information, that has been given to the wireless access apparatuses, so that the wireless access apparatuses with which the judgment section has judged that communication is possible can be identified; and
a comparison section that judges whether there is apparatus identification information that is not stored in the neighborhood database among the apparatus identification information stored in the registration database, wherein
if the comparison section judges that there is apparatus identification information that is not stored in the neighborhood database, among the apparatus identification information stored in the registration database, the judgment section performs the judgment again for a wireless access apparatus to which the apparatus identification information is given, after a predetermined time elapses; and
the monitoring apparatus further comprises a duplication section that copies and stores the apparatus identification information stored in the neighborhood database into the registration database if the comparison section judges that there is no apparatus identification information that is not stored in the neighborhood database, among the apparatus identification information stored in the registration database, or if the judgment section has performed judgment again for a predetermined number of times, wherein
the judgment section requests the apparatus identification information be given to wireless access apparatuses which are adjacently connected to the multiple wireless access apparatuses, from the multiple wireless access apparatuses and, when the apparatus identification information is transmitted from the wireless access apparatuses in response to the request, judges that communication with the wireless access apparatuses to which the apparatus identification information is given is possible.

8. The monitoring apparatus according to claim 7, comprising:
a display section that, if the comparison section has performed judgment again for the predetermined number of times, presents a display to that effect.

9. The monitoring apparatus according to claim 7, wherein the judgment section requests an IP address as the apparatus identification information.

10. The monitoring apparatus according to claim 7, comprising:
   a timer that measures whether the predetermined time has elapsed; and
   a counter that counts the number of times that judgment is performed again.

11. The monitoring apparatus according to claim 7, comprising:
   a setting section that sets the predetermined time and the predetermined number of times in response to an input from outside.

12. A monitoring method in a monitoring apparatus monitoring multiple wireless access apparatuses, the method comprising:
   a process that stores apparatus identification information, that has been given to the wireless access apparatuses, so that wireless access apparatuses registered as monitoring targets of the monitoring apparatus can be identified, into a registration database;
   a process that judges whether communication between the monitoring apparatus and the multiple wireless access apparatuses is possible;
   a process that stores apparatus identification information has been given to wireless access apparatuses so that the wireless access apparatuses with which communication is judged to be possible can be identified, into a neighborhood database;
   a process that judges whether there is apparatus identification information that is not stored in the neighborhood database among the apparatus identification information stored in the registration database;
   a process that, in the case of having judged that there is apparatus identification information that is not stored in the neighborhood database among the apparatus identification information stored in the registration database, performs judgment again for a wireless access apparatus to which the apparatus identification information is given, after a predetermined time elapse;
   a process that, in the case of having judged that there is no apparatus identification information that is not stored in the neighborhood database among the apparatus identification information stored in the registration database, or in the case of having performed judgment again for a predetermined number of times, copies and stores the apparatus identification information stored in the neighborhood database into the registration database,
   a process that requests that the apparatus identification information be given to wireless access apparatuses which are adjacently connected to the multiple wireless access apparatuses, from the multiple wireless access apparatuses; and
   a process that, when the apparatus identification information is transmitted from the wireless access apparatuses in response to the request, judges that communication between the monitoring apparatus and the wireless access apparatuses to which the apparatus identification information is given is possible.

13. The monitoring method according to claim 12, comprising:
   a process that, in the case of having performed judgment again for a predetermined number of times, presents a display to that effect.

14. The monitoring method claim 12, comprising:
   a process that requests an IP address as the apparatus identification information.

15. The monitoring method according to claim 12, comprising:
   a process that sets the predetermined time in response to an input from outside, and
   a process that sets the predetermined number of times in response to an input from outside.

\* \* \* \* \*